United States Patent
Bucknor et al.

(10) Patent No.: US 10,676,079 B1
(45) Date of Patent: Jun. 9, 2020

(54) HYBRID ELECTRIC POWERTRIAN SYSTEM WITH E-ACCESSORY DRIVE AND ASSOCIATED POWER SHARING ARCHITECTURE

(71) Applicant: GM Global Technology Operations LLC, Detroit, MI (US)

(72) Inventors: Norman K. Bucknor, Troy, MI (US); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 3 days.

(21) Appl. No.: 16/211,801

(22) Filed: Dec. 6, 2018

(51) Int. Cl.
| | | |
|---|---|---|
| *B60W 20/15* | (2016.01) | |
| *B60W 10/02* | (2006.01) | |
| *B60W 10/06* | (2006.01) | |
| *B60W 10/08* | (2006.01) | |
| *B60W 10/30* | (2006.01) | |
| *B60W 30/188* | (2012.01) | |
| *B60K 6/48* | (2007.10) | |

(52) U.S. Cl.
CPC .............. *B60W 20/15* (2016.01); *B60K 6/48* (2013.01); *B60W 10/02* (2013.01); *B60W 10/06* (2013.01); *B60W 10/08* (2013.01); *B60W 10/30* (2013.01); *B60W 30/1886* (2013.01); *B60K 2006/4825* (2013.01); *B60W 2510/0657* (2013.01); *B60W 2510/083* (2013.01); *B60W 2710/021* (2013.01); *B60W 2710/0666* (2013.01); *B60W 2710/083* (2013.01); *B60W 2710/105* (2013.01); *B60W 2710/30* (2013.01); *B60Y 2200/92* (2013.01)

(58) Field of Classification Search
None
See application file for complete search history.

(56) References Cited

U.S. PATENT DOCUMENTS

| 5,635,805 A * | 6/1997 | Ibaraki ..................... B60K 6/46 318/139 |
|---|---|---|
| 6,852,063 B2 * | 2/2005 | Takahashi ............... F02B 11/04 477/5 |
| 6,889,125 B2 * | 5/2005 | Nakao ................... F02N 11/003 701/22 |

(Continued)

*Primary Examiner* — Dirk Wright
(74) *Attorney, Agent, or Firm* — Quinn IP Law

(57) ABSTRACT

A hybrid electric powertrain system includes a transmission, engine, e-accessory, primary and secondary electric machines, and controller. The e-accessory is powered by the secondary electric machine in response to an accessory torque demand. The engine and primary electric machine are connected to the transmission and configured, alone or in combination, to provide input drive torque to the transmission. The secondary electric machine is connected to the e-accessory and satisfies the accessory torque demand. A first clutch between the secondary electric machine and a transmission input member connects the secondary electric machine to the input member. The controller, in response to an output torque request, executes a power-sharing strategy using an objective cost function that allocates engine torque, primary motor torque, and secondary motor torque to the input member to satisfy the output torque request, while satisfying the accessory torque demand via the secondary electric machine.

20 Claims, 5 Drawing Sheets

(56) References Cited

U.S. PATENT DOCUMENTS

| | | | | |
|---|---|---|---|---|
| 7,727,115 B2* | 6/2010 | Serkh | ............... | B60K 25/00 |
| | | | | 477/115 |
| 8,347,992 B2* | 1/2013 | Gecim | ............... | B60K 6/485 |
| | | | | 180/65.265 |
| 8,479,847 B2* | 7/2013 | Hart | ............... | B60K 6/485 |
| | | | | 180/65.21 |
| 8,781,664 B2* | 7/2014 | Sujan | ............... | B60W 10/02 |
| | | | | 701/22 |
| 8,808,124 B2* | 8/2014 | Major | ............... | B60K 6/48 |
| | | | | 180/65.265 |
| 9,074,656 B2* | 7/2015 | Benz | ............... | F02B 67/06 |
| 9,522,672 B2* | 12/2016 | Okamoto | ............... | B60W 10/06 |
| 9,587,559 B2* | 3/2017 | Hemphill | ............... | B60K 6/38 |
| 10,415,699 B2* | 9/2019 | Tohta | ............... | F16H 45/02 |
| 2009/0314559 A1* | 12/2009 | Palitto | ............... | B60K 5/08 |
| | | | | 180/65.22 |

* cited by examiner

FIG. 4A  FIG. 4B

HYBRID ELECTRIC POWERTRIAN SYSTEM WITH E-ACCESSORY DRIVE AND ASSOCIATED POWER SHARING ARCHITECTURE

INTRODUCTION

The present disclosure relates to power sharing architectures and control strategies for use with hybrid electric powertrains of various configurations. Hybrid electric powertrains use multiple different torque sources to generate and transmit drive torque to a coupled load. For instance, an internal combustion engine and an electric traction motor may supply input torque to a planetary transmission, with an output member of the transmission coupled to the driven load. Engine and motor torque may be allocated in real-time to satisfy operator-requested or autonomously-requested output torque levels. Hybrid electric powertrains may also include air conditioning compressors and various other high-voltage accessories powered via a main propulsion battery pack over a DC voltage bus. A hybrid electric powertrain can improve fuel economy and output torque response relative to a propulsion system relying solely on the combustion of fossil fuels.

SUMMARY

A hybrid electric powertrain system and related power-sharing control strategies are disclosed herein. In various embodiments, the powertrain system includes a drive axle coupled to a driven load, e.g., a set of road wheels of a motor vehicle, with coupling being via a planetary transmission. The powertrain system also includes primary and secondary electric machines, an electric machine-powered mechanical accessory ("e-accessory"), at least one clutch, and a controller. The primary electric machine provides motor torque to a driveline of the powertrain system for powering the driven load. As its core function in the disclosed powertrain system, the secondary electric machine provides accessory/secondary motor torque at a level sufficient for powering the e-accessory. The powertrain system may also include an internal combustion engine that, alone or in conjunction with the primary electric machine, provides input torque to the transmission. Thus, "main" and "primary" refer to the provision of driveline torque, exclusively, while the term "secondary" refers to the selective provision of supplemental driveline torque when needed, up to a level that is available after satisfying torque requirements of the e-accessory.

As described in further detail below, the controller selectively implements the above-noted power-sharing strategy by selectively connecting the secondary electric machine to the driveline in order to augment input torque. Thus, input torque to the transmission is determined in real-time as a function of (1) engine torque when available, and (2) primary and secondary motor torques, less (3) a required amount of accessory torque or accessory load. Real-time allocation of torque from the engine and electric machines to the driveline is determined via an objective cost function. A goal of the cost function may be selectable by an operator or preprogrammed. For instance, the goal may be maximization of fuel economy, or the goal may be extension of battery power or life. Depending on the overall system operating state, each electric machine may deliver positive, negative, or zero motor torque.

A hybrid electric powertrain system according to an example embodiment includes a transmission, an internal combustion engine, an e-accessory, primary and secondary electric machines, and a controller. The transmission includes an input member and an output member, with the latter being connected to a load, e.g., drive wheels. The e-accessory is powered via a secondary motor torque in response to an accessory torque demand. The engine and primary electric machine are connected to the input member and are configured, alone or in combination, to provide input drive torque to the input member. The secondary electric machine is connected to the e-accessory and satisfies the accessory torque demand via secondary motor torque. A first clutch, when closed, connects the secondary electric machine and input member.

The controller is configured, in response to an output torque request, to execute a power-sharing strategy using an objective cost function. The cost function allocates a respective contribution of the engine torque, the primary motor torque, and the secondary motor torque to the input member to satisfy the output torque request, and to simultaneously satisfy the accessory torque demand via the secondary electric machine.

The e-accessory may be embodied as an air conditioning compressor.

A first endless drive element may be used to connect the secondary electric machine to the input member via the first clutch when the first clutch is closed. The primary electric machine may be continuously connected to the input member via such a first endless drive element.

A second clutch may be disposed between the engine and the input member. A second endless drive element in such an embodiment is continuously connected to the primary electric machine and selectively connected to the internal combustion engine via the second clutch. A third clutch selectively connects the first endless drive element and the secondary electric machine to the engine. A second endless drive element and a second clutch, when in a closed state, may be used to connect the engine to the first endless drive element.

The controller may open the first clutch, via clutch control signals, and power the e-accessory via the secondary electric machine responsive to the internal combustion engine being in an off state.

The objective cost function may be a three-level optimization search on the engine torque, the primary motor torque, and the secondary motor torque.

In some embodiments, the controller is configured to derive an available amount of the secondary motor torque as a difference between a maximum torque capacity of the secondary electric machine and the accessory torque demand, and to command the first clutch to close when the available amount of the secondary motor torque exceeds a threshold.

The controller may optionally receive a requested goal of the objective cost function, and allocate the respective contribution of the engine torque, the primary motor torque, and the secondary motor torque using the requested goal, e.g., minimizing a total required electrical power of the hybrid electric powertrain system.

Also disclosed herein is a power sharing method for use with the above-noted hybrid electric powertrain system. The method may include providing a secondary motor torque to the e-accessory via the secondary electric machine at a level sufficient for satisfying an accessory torque demand of the e-accessory, and receiving an output torque request via a controller.

The method in this embodiment also includes, responsive to a power sharing mode signal, closing a first clutch via the controller to thereby connect the secondary electric machine to an input member of the transmission, and allocating, via the controller using an objective cost function, a respective torque contribution from the engine, primary electric machine, and secondary electric machine to satisfy the output torque request while satisfying the accessory torque demand.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIGS. 4A and 4B are schematic illustrations of alternative configurations of the power-sharing architecture of FIG. 4.

Figure 1:
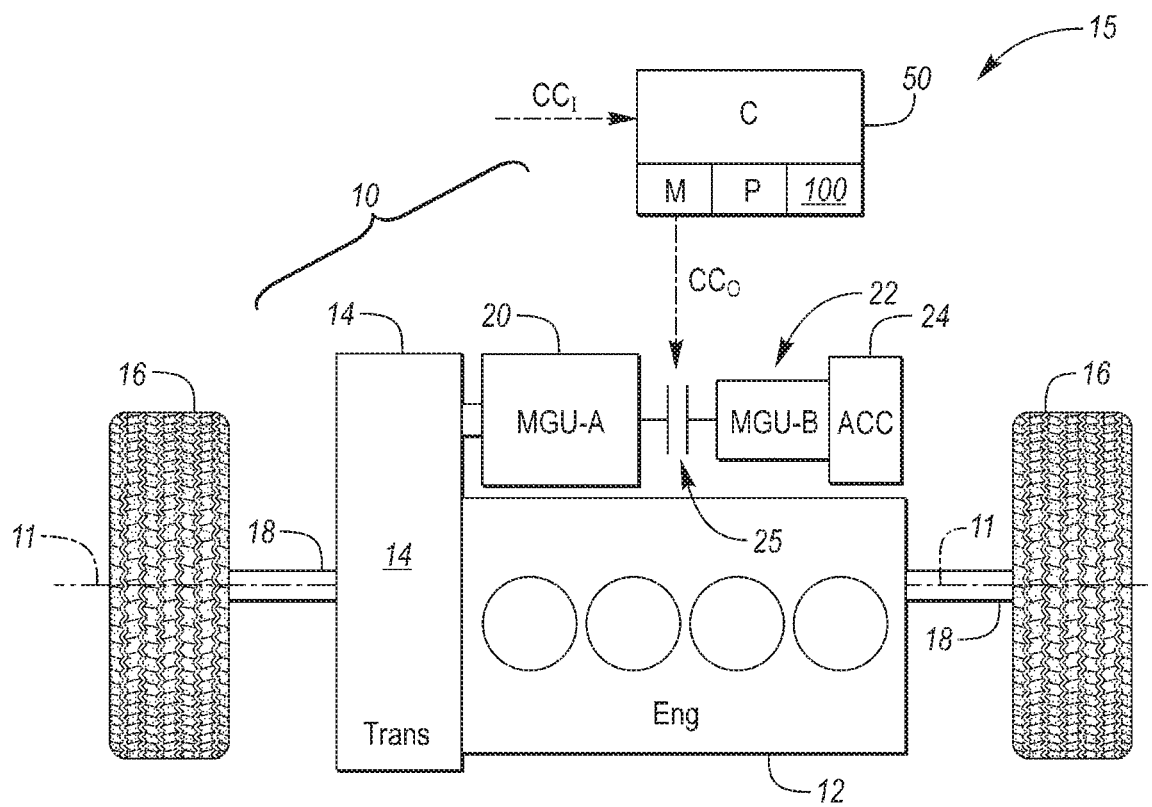
FIG. 1 is a schematic illustration of an exemplary motor vehicle having a hybrid electric powertrain system that provides a power-sharing control strategy as described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to like components, FIG. 1 depicts an example hybrid electric powertrain system 10 having an internal combustion engine ("Eng") 12, a transmission ("Trans") 14, and a controller (C) 50. Along with the engine 12, a main/primary electric machine (MGU-A) 20 is connected to an input side of the transmission 14, e.g., input member 133 of FIG. 4, with various alternative arrangements shown in FIGS. 3A-5 as set forth below. A secondary electric machine 22 (MGU-B) is also included in the powertrain system 10, with the accessory drive function of the secondary electric machine 22 described below.

The controller 50 is configured to selectively implement a power-sharing strategy in response to an output torque request, with the strategy embodied as a computer-executable method 100. The controller 50 does so using an objective cost function that enables the controller 50 to determine and allocate a respective torque contribution of the primary electric machine 20, the secondary electric machine 22, and the engine 12 as input torque to the transmission 14. As part of the method 100, the controller 50 may receive a requested goal of the objective cost function, e.g., maximizing power outflow, maximizing battery life or fuel economy, etc., and select an allocation that satisfies the stated goal. With three example torque sources, for instance, the controller 50 may use a three-level optimization search on engine torque, primary motor torque, and secondary motor torque.

The controller 50 may be embodied as one or more digital computers including a processor (P), e.g., a microprocessor or central processing unit, as well as memory (M) in the form of read only memory, random access memory, electrically-programmable read only memory, etc. The controller 50 may also include a high-speed clock, analog-to-digital and digital-to-analog circuitry, input/output circuitry and devices, and appropriate signal conditioning and buffering circuitry.

The hybrid electric powertrain system 10 may be used as part of a motor vehicle 15 as shown, e.g., a motor vehicle with a set of drive wheels 16 connected to a drive axle 18 on an output side of the transmission 14, rotating about an axis 11, and thus acting as a driven load. In embodiments other than the illustrated motor vehicle 15, the driven load may take the form of a propeller-shaft assembly of a marine vessel or an aircraft, flanged wheels of a train or other rail vehicle, etc., and therefore the example motor vehicle 15 is intended to be illustrative and non-limiting. Each drive wheel 16 or other driven load contemplated herein is powered via motor torque from the primary electric machine 20 and/or the engine 12, with such a torque combination at times being assisted or augmented by motor torque from the secondary electric machine 22 in a manner determined by the controller 50 according to the method 100.

The secondary electric machine 22 is connected to and thus drives an accessory component (e-accessory) 24, for instance an air conditioning compressor. Here, the prefix "e" as used in "e-accessory" refers to a mechanical device being driven by an electric motor. A clutch 25, such as a mechanical friction plate clutch, an electromagnetic clutch, or a rotating one-way clutch, may be disposed between the secondary electric machine 22 and the input side of the transmission 14, and may be closed to selectively connect the secondary electric machine 22 to the driveline of the vehicle 15 as noted below. In terms of relative power capability, the primary electric machine 20 may output at least 3-4 times the amount of power that is output by the secondary electric machine 22, with example power output levels of about 15 kW or more for the primary electric machine 20 and about 5 kW or more for the secondary electric machine 22. Power flow to and from the respective primary and secondary electric machines 20 and 22 is managed in real-time by the controller 50, with the controller 50 receiving input signals ($CC_I$) regulating operation of the powertrain system 10 and, responsive to such input signals ($CC_I$), generating a set of control signals ($CC_O$).

Although omitted from FIG. 1 for illustrative simplicity, the primary and secondary electric machines 20 and 22 are powered via a battery pack (not shown) having an application-specific number of lithium-ion battery cells, or cells of another suitable battery chemistry. When the respective primary and secondary electric machines 20 and 22 are embodied as polyphase electric machines, such a battery pack is connected via a power inverter module which inverts a DC voltage from the battery pack and a connected DC voltage bus into a polyphase voltage suitable for energizing individual phase windings of the electric machine(s) 20 and 22, respectively.

In the exemplary hybrid electric powertrain system 10 of FIG. 1, some operating modes may be realized with the engine 12 in an off/unfueled state. Since the engine 12 is not fueled, engine torque from the engine 12 is not available as input torque to the transmission 14. The secondary electric machine 22 may be used to power the e-accessory 24 during such an operating mode. Additionally, for improved efficiency in terms of reduced packaging space and tailpipe emissions, the controller 50 may also implement the present power-sharing strategy, via execution of the method 100, to selectively connect the secondary electric machine 22 to the driveline, e.g., via operation of the clutch 25, thereby allowing secondary motor torque from the secondary electric machine 22 to selectively augment input torque to the transmission 14 from the engine 12 and/or primary electric machine 20. This action possibly improves the transient torque response or torque quality when used in combination with torque from the engine 12 and/or the primary electric machine 20.

As part of the present method 100, the e-accessory 24 may be selectively coupled to the drivetrain via closing of the clutch 25. Relative position of the clutch 25 in the powertrain system 10 may vary with the particular architecture of the powertrain system 10. The e-accessory 24 remains independently-controllable and thus free to operate when the vehicle 10 is stationary or whenever operation of the e-accessory 24 otherwise requires such operation. Additionally, dual-use of the secondary electric machine 22 is enabled for propulsion of the vehicle 15 and for driving the e-accessory 24, which in turn improves fuel economy without additional weight, packaging space, and complexity, and also without requiring the primary electric machine 20 to be decoupled from the driveline.

Figure 2:
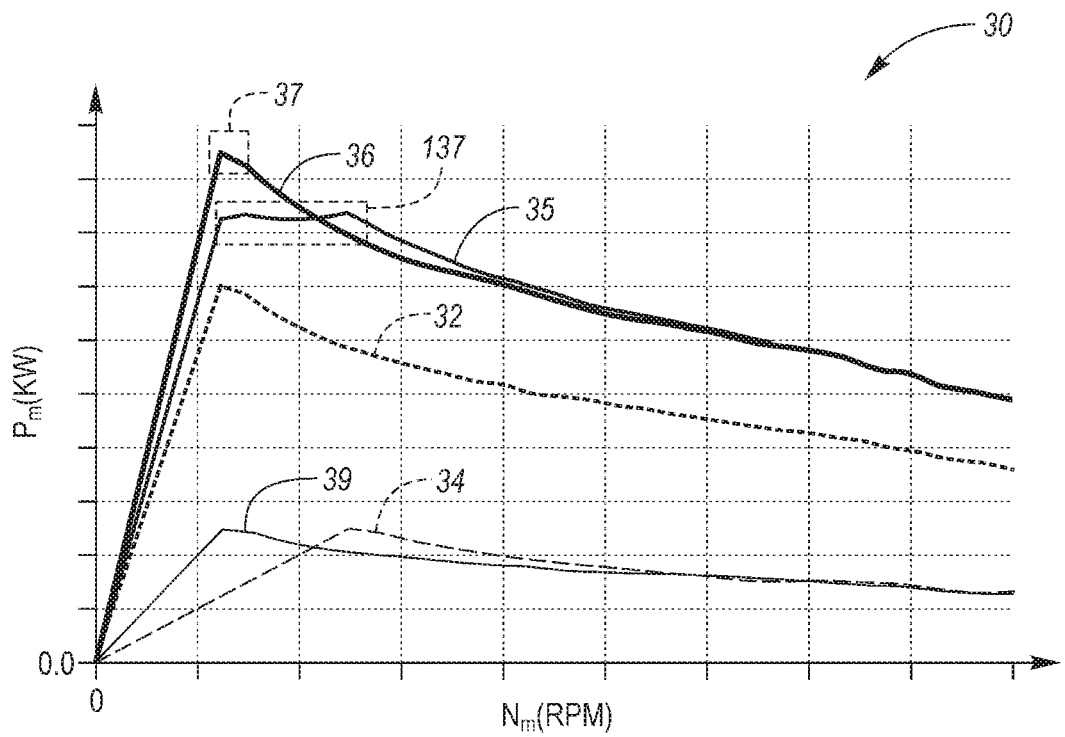
FIG. 2 is a plot of power curves of primary and secondary electric machines of the example powertrain system shown in FIG. 1, with electric machine power depicted on the vertical axis and electric machine speed depicted on the horizontal axis.

FIG. 2 illustrates an example set of power curves 30 depicting a potential benefit of the present power-sharing strategy in terms of motor corner speed, i.e., a torque-speed operating point at which a given motor reaches its peak power. Using the present method 100, the secondary electric machine 22 may be provided with a corner speed that differs from that of the primary electric machine 20, with the primary electric machine 20 having the corresponding power curve indicated by trace 32. Trace 39 is a power curve of the secondary electric machine 22 having a corner speed coinciding with that of trace 32. Trace 36 is the resultant power curve of the primary and secondary electric machines 20 and 22 operating as the same corner speed, i.e., a resultant curve derived by adding together the magnitudes of traces 32 and 33. Zone 37 depicts an area in which torque delivery to the driveline may be optimized using the secondary electric machine 22, albeit over a limited speed range given the sharp trajectory of zone 37.

Selectively connecting the secondary electric machine 22 to the driveline when configured with a different corner speed and coinciding power curve, as indicated by trace 34, and independently controlling the secondary electric machine 22 thus creates a resultant trace 35 with zone 137. Zone 137, when compared to zone 37 with its coinciding corner speeds, has an extended/flatter profile. A performance implication of the plateaued profile of zone 137 is that a greater opportunity exists, using the present power-sharing strategy, for tailoring a power curve of the combined primary and secondary electric machines 20 and 22 to better optimize torque delivery over a wider speed range.

Figures 3A, 3B:
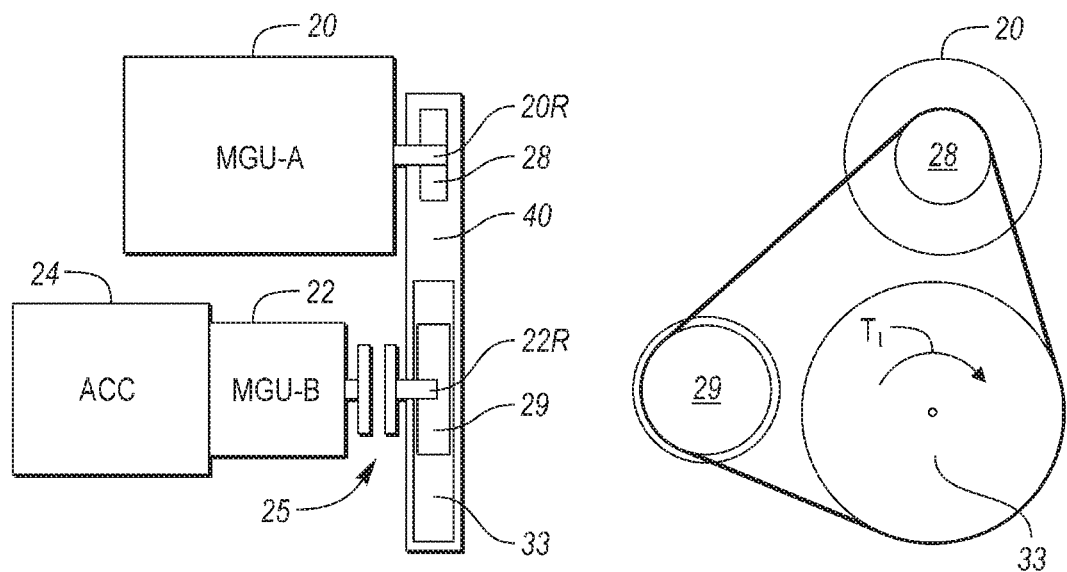
FIGS. 3A and 3B are schematic illustrations of an exemplary power-sharing architecture.

FIGS. 3A and 3B illustrate a schematic layout for implementing the present power-sharing strategy, with the layout of FIGS. 3A and 3B being schematic and not to scale. A rotor 20R of the primary electric machine 20 is directly connected to a drive belt 40 or other endless drive element via a pulley 28. As used herein, "endless drive element" refers to a continuous loop of belt, chain, or other material in driving engagement with the pulley 28. In FIG. 3A, the drive belt 40 connects the secondary electric machine 22 to an input member of the transmission 14, e.g., the input member 33, via the clutch 25 when the clutch 25 is closed. Separately, the secondary electric machine 22 in the illustrated embodiment is directly and continuously connected to the e-accessory 24. The clutch 25 is depicted in an open state, such that the secondary electric machine 22 is able to power the e-accessory 24 without delivering supplemental torque to the driveline via the drive belt 40. The primary electric machine 20 is continuously connected to the input member 33 via the drive belt 40 in such an embodiment.

As best shown in FIG. 3B, a transmission input member 33 rotates with input torque (arrow Ti), with the composition of the input torque (arrow Ti) possibly including motor torque from the primary electric machine 20, engine torque from the engine 12, or both. When the clutch 25 of FIG. 3A is closed at the command of the controller 50 of FIG. 1, motor torque from the secondary electric machine 22 is transferred across the clutch 25 to another pulley 29 via a rotary member 22R. Thus, the input torque (arrow Ti) with the clutch 25 in a closed state may be an optimal combination of available torques from the engine 12 and the primary and secondary electric machines 20 and 22, respectively, with optimization performed as part of the method 100 as described below with reference to FIGS. 6 and 7. Other embodiments may include integrating the primary and secondary electric machines 20 and 22 into a single housing with clutched rotors, as will be appreciated by those of ordinary skill in the art.

Figure 4:
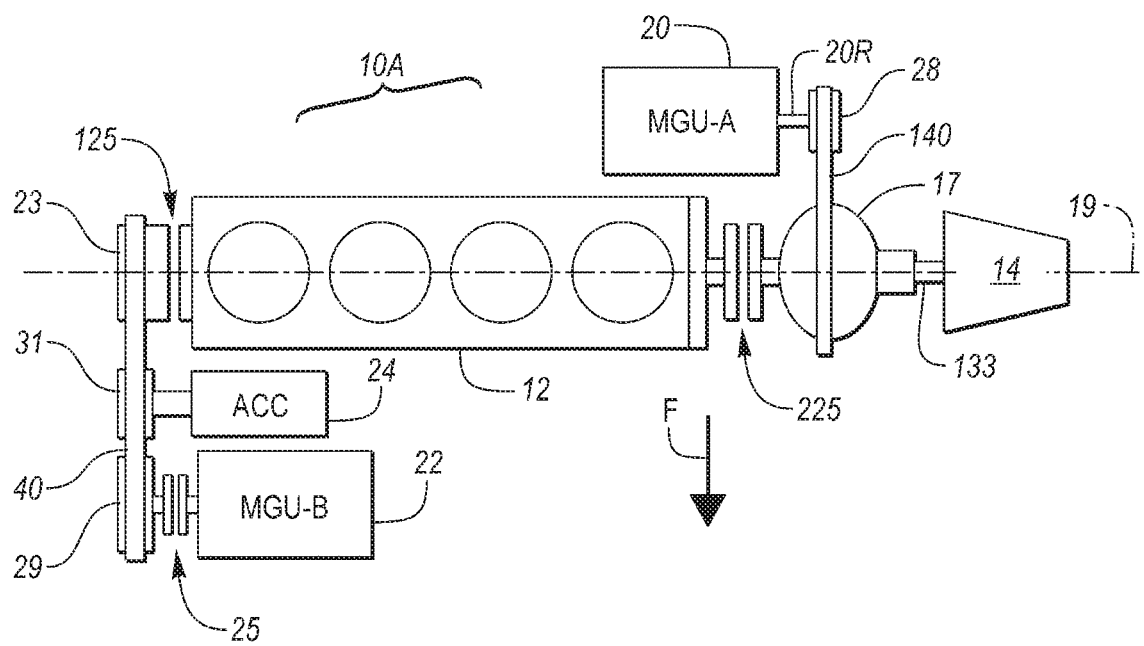
FIG. 4 is a schematic illustration of an alternative embodiment of the hybrid electric powertrain system shown in FIGS. 3A and 3B.

An alternative hybrid electric powertrain system 10A is depicted in FIGS. 4, 4A, and 4B. The primary electric machine 20 in these embodiments may be continuously connected via pulley 28 to another drive belt 140 located on an opposite end of the engine 12, as shown in FIG. 4, e.g., to implement a front-wheel drive variation. Arrow F indicates the forward-facing direction of a vehicle (not shown) having such a powertrain system 10A. The various arrangements could also be arranged as rear-wheel drive configurations in other embodiments. The primary electric machine 20 is continuously connected to the drive belt 140 via the rotor 20R and pulley 28. A gear set 17 (FIG. 4) may be used to couple the drive belt 140 to an input member 133 of the transmission 14 in this embodiment, with the driveline having an in-line orientation of the engine 12, the input member 133, and the transmission 14 along a common driveline 19. Another clutch 225 may be opened to disconnect the engine 12 from the driveline 19 as needed, with clutch 225 disposed between the engine 12 and the input member 133. The drive belt 140, which is continuously connected to the primary electric machine 20, is selectively connected to the engine 12 via clutch 225.

At the opposite end of the engine 12, the e-accessory 24 is coupled to drive belt 40 via a pulley 31 and powered via torque from the secondary electric machine 22 when the clutch 25 is closed, with the secondary electric machine 22 connected to the drive belt 40 via a pulley 29. As the engine 12 powers a crankshaft pulley 23 in the FIG. 4 embodiment, the e-accessory 24 could also be powered by the engine 12. Another clutch 125 may selectively connect the drive belt 40 and secondary electric machine 22 to the engine 12 to connect or disconnect the engine 12 from the pulley 23 and the drive belt 40 in certain operating modes.

FIGS. 4A and 4B depict embodiments of the hybrid powertrain system 10A of FIG. 4 with slight variations. FIG. 4A omits the engine 12 for simplicity, and shows the clutch 25 connecting the e-accessory 24 to the drive belt 40 as opposed to the secondary electric machine 22 as in FIG. 4. As shown in FIG. 4B, the engine 12 of FIG. 1 and the primary electric machine 20 may combine to deliver input torque (arrow Ti) to the crankshaft pulley 23. The e-accessory 24 is selectively disconnected or connected to the drive belt 40 as needed via operation of the clutch 25 of FIG. 4A. Another clutch 125 (FIG. 4) may be integrated with the crankshaft pulley 23 to disconnect the engine 12 from the primary electric machine 20. This allows the primary electric machine 20 to drive the accessory 24 when the engine 12 is stopped.

Figure 5:
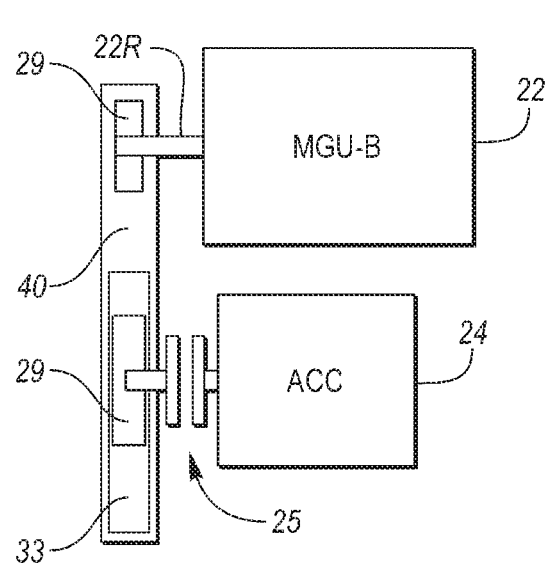
FIG. 5 is a schematic illustration of a power-sharing architecture according to an exemplary dual-belt embodiment.
Figure 5:
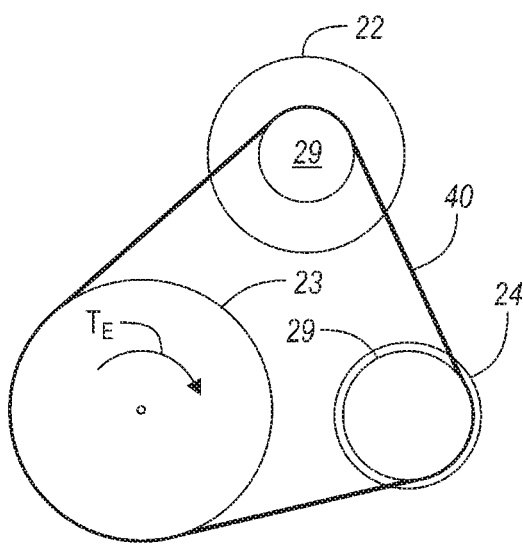
Figure 5:
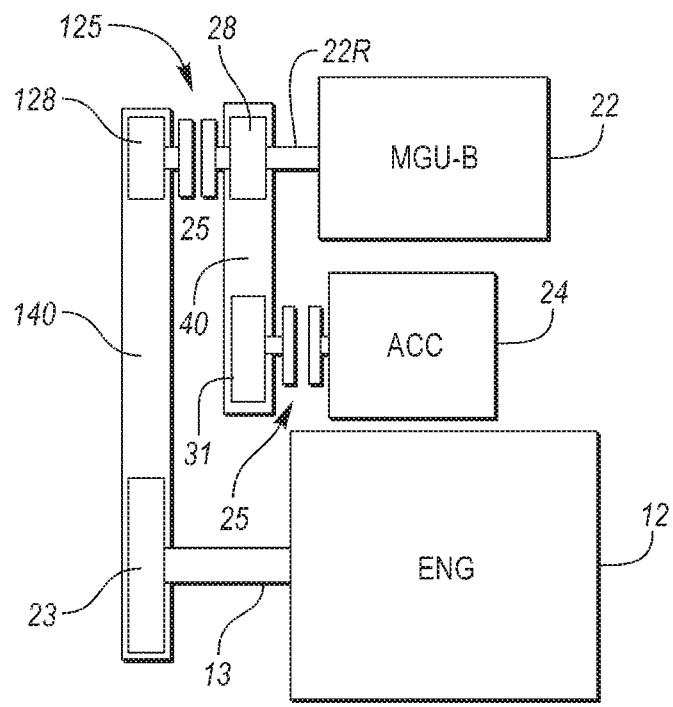

Referring to FIG. 5, an optional dual-belt arrangement may be used having both drive belts 40 and 140, with the drive belt 140 disposed axially outward of the drive belt 40. Here, the secondary electric machine 22 may be directly and continuously coupled to the drive belt 40 via the rotor 22R and the pulley 28, and selectively connected to the drive belt 140 via the clutch 125. The e-accessory 24 remains selectively connectable to the drive belt 40 via the clutch 25 as noted above. The engine 12 of FIG. 1, via crankshaft pulley 23 and a crankshaft 13 of the engine 12, is continuously connected to the drive belt 140 in this particular configuration.

A commanded opening of the clutch 125 by the controller 50 disconnects another pulley 128 from the secondary electric machine 22, with the pulley 128 situated opposite pulley 28. In turn, as the engine 12 is coupled to the pulley 128 via the drive belt 140, this control action also disconnects the crankshaft 13/crankshaft pulley 23 from the secondary electric machine 22, thus allowing the secondary electric machine 22 to drive the e-accessory 24 via the pulley 31 when the clutch 25 is commanded closed/applied. Such an action may occur, for instance, whenever the controller 50 detects that the engine 12 is stopped and thus not powering the drive belt 140. Clutch 25 in this particular embodiment is optional, with its use, e.g., as an electromagnetic clutching mechanism, possibly reducing drag when the e-accessory 24 is not in use.

Figure 6:
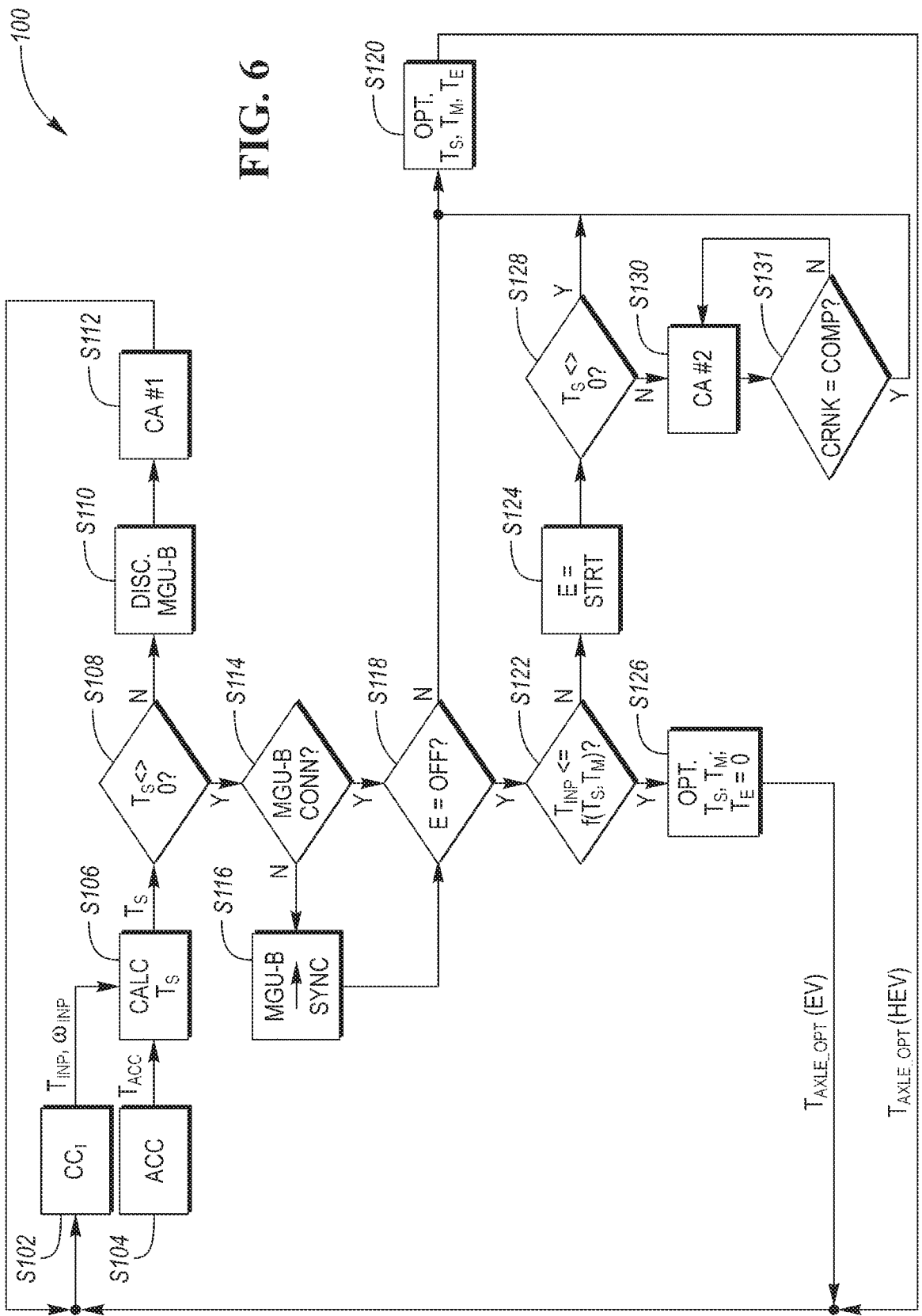
FIG. 6 is a flow chart describing a power-sharing method for use with the various powertrain systems of the present disclosure.

An example embodiment of the present method 100 and resultant power-sharing strategy is shown in FIG. 6. Referring to the example hybrid electric powertrain system 10 of FIG. 1 and commencing with step S102, the controller 50 receives the input signals ($CC_I$) and determines a corresponding input torque and speed request, i.e., $T_{inp}$ and $\omega_{inp}$, respectively. The method 100 then proceeds to step S106.

Step S104, which is executed in parallel with step S102, entails determining an accessory load demand ($T_{acc}$) on the e-accessory 24. When the e-accessory 24 is an air conditioning compressor, step S104 may include processing the input signals ($CC_I$) to determine fan/blower speed, temperature settings, and/or other parameters of the e-accessory 24 and thereafter deriving the accessory load demand ($T_{aac}$) as the accessory load demand ($T_{aac}$), for instance via a lookup table. The method 100 then proceeds to step S106.

At step S106, the controller 50 calculates a secondary torque ($T_S$) from the secondary electric machine 22. The available secondary torque ($T_S$) is a remaining amount of a maximum torque capacity ($T_{max}$) of the secondary electric machine 22 after the secondary electric machine 22 first satisfies the accessory load demand ($T_{aac}$), i.e., $T_S=T_{max}-T_{acc}$. The calculated torque value is saved in memory (M) of the controller 50 as the method 100 proceeds to step S108.

At step S108, the controller 50 compares the available secondary torque ($T_S$) from step S106 to a calibrated near-zero torque value to determine if the available secondary torque ($T_S$) is negligible, i.e., too low to be functionally useful. The method 100 proceeds to step S110 if the secondary torque ($T_S$) is negligible. Step S114 is executed in the alternative when the available secondary torque ($T_S$) from step S102 is a non-negligible amount, such that a useful amount of motor torque from the secondary electric machine 22 is available for performing functions other than powering the e-accessory 24.

Step S110 of the method 100 depicted in FIG. 6 includes disconnecting the secondary electric machine 22 (MGU-B) from the driveline, which may entail transmitting clutch control signals to the clutch 25 to cause the clutch 25 to open. The method 100 then proceeds to step S112.

Step S112 may include executing a first control action ("CA #1") as a nominal hybrid control strategy. That is, with the secondary electric machine 22 disconnected, the controller 50 may continue to use the primary electric machine 20 and/or the engine 12 of FIG. 1 to provide torque to the transmission 14 and driveline for propelling the example vehicle 15. The method 100 is complete, resuming anew with step S102.

At step S114, the controller 50 determines whether the secondary electric machine 22 is connected from the driveline ("MGU-B CONN?"). The controller 50 proceeds to step S118 if the secondary electric machine 22 is connected from the driveline, i.e., if the clutch 25 is closed. Step S116 is executed in the alternative if the clutch 25 remains open.

At step S116, the controller 50 commands the secondary electric machine 22 to rotate, with such commands sustained until the secondary electric machine 22 reaches a synchronous speed with the primary electric machine 20 ("MGU-B→SYNC"). Once the rotational speeds of the respective primary and secondary electric machines 20 and 22 are sufficiently synchronized, the controller 50 may command the clutch 25 to close before proceeding to step S118.

Step S118 includes determining, via the controller 50, whether the engine 12 is off/unfueled ("E=OFF?"). The controller 50 then proceeds to step S120 when the engine 12 is on/running, and to step S122 in the alternative when the engine 12 is off.

At step S120, with the engine 12 in an on/running state, the controller 50 may execute an optimization strategy ("OPT. $T_S$, $T_M$, $T_E$") to find an optimal combination of secondary torque ($T_S$), engine torque ($T_E$), and primary torque ($T_M$) for powering the driveline, that is, for collectively providing the necessary propulsion torque when propelling the vehicle 15 of FIG. 1. An example optimization strategy is described below with reference to FIG. 7. The controller 50 outputs an optimized axle toque ($T_{axle\_opt}$) as the optimized/cost function-based combination of torque sources available to the controller 50, for instance to determine individual torque commands for the engine 12 and both of the primary and secondary electric machines 20 and 22 in the vehicle 15 (HEV) of FIG. 1.

At step S122, the controller 50, having previously determined at step S118 that the engine 12 is off, determines if the required total amount of input torque ($T_{inp}$) derived at step S102 is less than a predetermined functional combination of the available secondary and primary torque levels, i.e., ƒ($T_S$, $T_M$). If so, the controller 50 proceeds to step S126. The controller 50 proceeds instead to step S124 when the required total amount of input torque ($T_{inp}$) from step S102 exceeds the combined available secondary and primary torque levels, i.e., $T_S$ and $T_M$, respectively.

Step S124 includes starting the engine 12 ("E=STRT"). Here, the controller 50 may transmit signals to an engine control unit (not shown) to commence fueling and firing of the engine 12, as will be readily appreciated by one of ordinary skill in the art. The method 100 then proceeds to step S128.

Step S126 entails performing an optimization function ("OPT. $T_S$, $T_M$; $T_E$=0") via the controller 50 to find an optimized torque combination of the respective primary and secondary torque, $T_S$ and $T_M$, with engine 12 in an off state ($T_E$=0). Since the engine 12 is off, the controller 50 outputs an optimized axle toque ($T_{axle\_opt}$) as the optimized/cost function-based combination of individual torque commands for the primary and secondary electric machines 20 and 22 in an electric vehicle (EV) mode of the vehicle 15 shown in FIG. 1.

Step S128, as with step S108, includes using the controller 50 to compare the available secondary torque ($T_S$) determined at step S106 to a calibrated near-zero torque value to determine if the available secondary torque ($T_S$) is negligible. The method 100 proceeds to step S130 if the secondary torque ($T_S$) is negligible. Step S120 is executed in the alternative when the available secondary torque ($T_S$) from step S102 is a non-negligible amount, i.e., when a useful amount of torque from the secondary electric machine 22 remains available for performing functions other than powering the e-accessory 24.

Step S130 includes executing a second control action ("CA #2") with respect to the hybrid electric powertrain system 10 of FIG. 1. At this step, the controller 50 may commence cranking and starting of the engine 12 responsive to the state initiated at step S124, with the method 100 proceeding to step S131. The controller 50 may also use torque from the primary electric machine 20 and the engine 12, once started, to generate input torque to the transmission 14 of FIG. 1.

At step S131, the controller 50 determines whether the cranking and starting process of the engine 12 is complete ("CRNK=COMP?"). Steps S130 and S132 are repeated in a loop until the engine 12 has started. The method 100 then proceeds to step S120.

Figure 7:
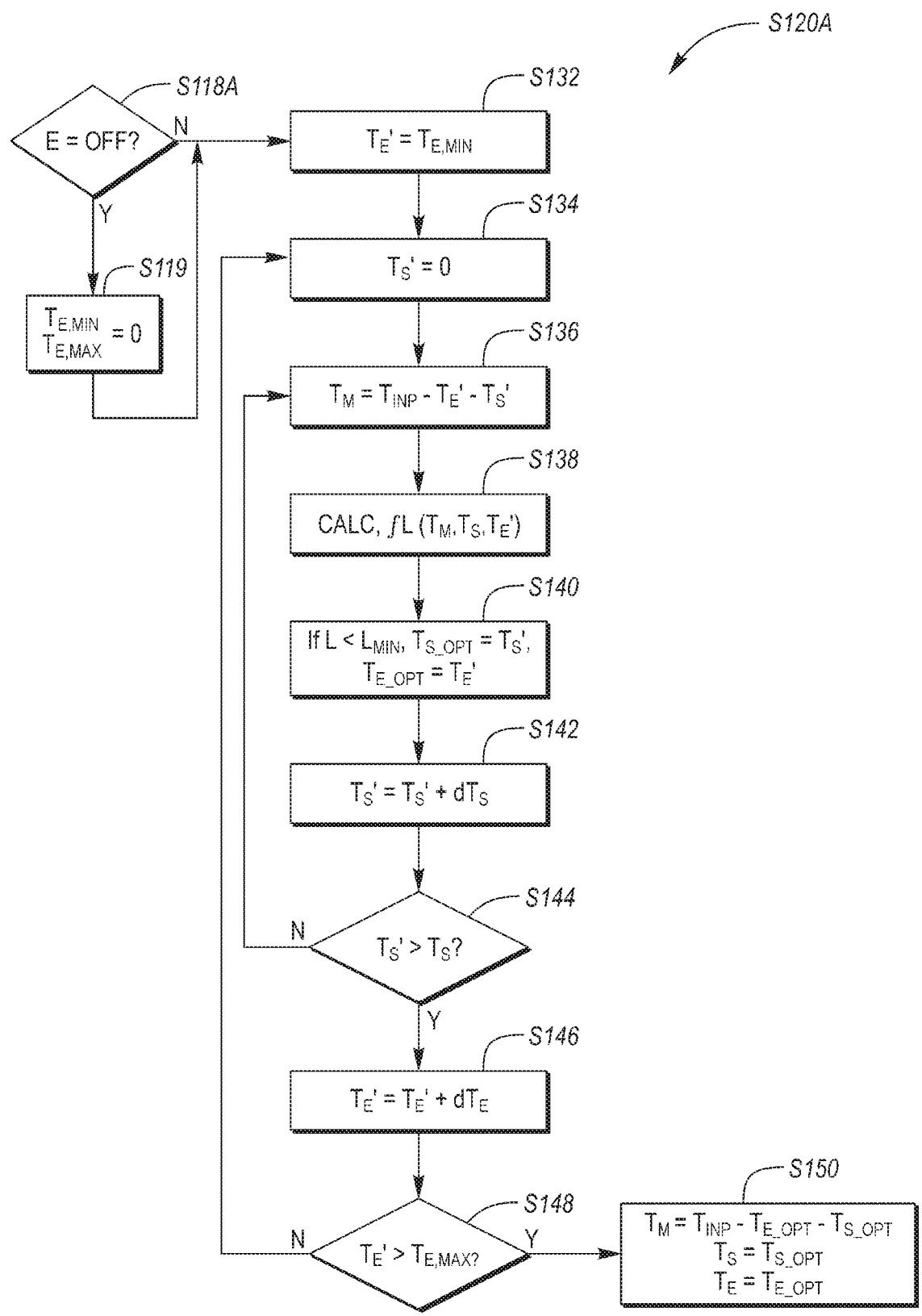
FIG. 7 is a flow chart describing an optimization subroutine usable as part of the method of FIG. 6.

FIG. 7 describes a possible sub-routine 5120A for implementing step S120 of FIG. 6 in order to optimize the torque contributions from the engine 12 and the respective primary and secondary electric machines 20 and 22. In the logic flow, the current secondary torque ($T_S'$) ranges from 0 to an amount of torque available from the secondary electric machine 22, i.e., $T_S$. The current engine torque ($T_E'$) will range from $T_{E,MIN}$ to $T_{E,MAX}$. Once $T_S'$ is equal to $T_S$, the next successive increment of $T_S'$ in the optimization scheme will exceed $T_S$, which is indicated below in step S144 as a "greater than" comparison (>). Incrementation of step S142 occurs right before such a test is performed. The same logic applies in steps S146 and S148 with respect to current and maximum engine torque values $T_E'$ and $T_{E,MAX}$.

At step S118A, shown as step S118 of FIG. 6, the controller 50 determines whether the engine 12 is off ("E=OFF?"). The controller 50 proceeds to step S119 when the engine 12 is off, and to step S132 when engine 12 is running.

At step S119, the controller 50 sets the range of possible engine torque, i.e., $T_{E,MIN}$ and $T_{E,MAX}$, to zero. The sub-routine 5120A then proceeds to step S132.

Step S132 includes setting the minimum engine torque equal to the current engine torque ($T_E'$), which may be zero if the engine 12 is off at step S118A or a non-zero value otherwise. The sub-routine 5120A then proceeds to step S134.

Step S134 entails setting the current secondary torque from the secondary electric machine 22 to zero, and then proceeding to step S136.

At step S136 the controller 50 next calculates the main torque ($T_M$), i.e., the torque available from the primary electric machine 20, as $T_M = T_{INP} - T_E' - T_S'$, where $T_{INP}$ in the input torque to the transmission 14, $T_E'$ is the current engine torque, and $T_S'$ is the current secondary torque. The method 100 then proceeds to step S138.

At step S138, the controller 50 calculates a maximum or minimum solution to an objective cost function (L) for the torque values $T_M$, $T_S'$, and $T_E'$. Possible criteria for the objective cost function (L) include system losses, e.g., electrical system losses and/or fuel losses, or another desired performance metric such as maximizing output torque from the transmission 14 of FIG. 1. The method 100 then proceeds to step S140.

Step 140 may include, when L is less than a calibrated minimum ($L_{MIN}$), setting an optimal secondary torque ($T_{S\_OPT}$) from the secondary electric machine 22 as the current secondary torque ($T_S'$), and the optimal secondary torque ($T_{E\_OPT}$) from the engine 12 as the current engine torque ($T_E'$). The method 100 then proceeds to step S142.

Step S142 includes incrementing the current secondary torque ($T_S'=T_S'+dTS$) and proceeding to step S144. For instance, if the secondary torque has a range of 0 to 200 Nm, the objective function (L) might be run in 20 Nm increments, with optimization performed in ten loops of steps S136-S144. So, for such an example, "increment" would equate to increasing the current secondary torque ($T_S'$) by 20 Nm and then proceeding to step S144.

Step S144 entails comparing the current secondary torque ($T_S'$) to its maximum available value ($T_S$). If $T_s'$ exceeds $T_s$, the method 100 proceeds to step S146. Otherwise, the method 100 repeats step S136.

Step S146 includes, in a step analogous to step S142, incrementing the current engine torque ($T_E'=T_E'+dT_E$) and proceeding to step S148. As with step S142, "incrementing" means increasing the current engine torque ($T_E'$) by a predetermined amount and then proceeding to step S148.

At step S148, the controller 50 compares the current engine torque ($T_E'$) to its maximum available value ($T_E$). If the current engine torque ($T_E'$) exceeds the maximum available ($T_E$), the method 100 proceeds to step S150 with the optimized results from the optimization of steps S134-S146, i.e., $T_{E\_OPT}$ and $T_{S\_OPT}$, temporarily recorded in memory (M). Otherwise, the method 100 repeats step S134.

Step S150 may entail outputting the optimal solution set to the objective function (L) of step S138. That is, with $T_M = T_{INP} - T_{E\_OPT} - T_{S\_OPT}$, the controller 50 commands the secondary electric machine 22 to output its optimal torque ($T_{S\_OPT}$) and also commands the engine 12 to output its optimal torque ($T_{E\_OPT}$).

The strategy described above is intended to enable the primary electric machine 20 of FIG. 1 and the various alternative embodiments to be at zero speed and still enable the e-accessory 24 to be driven independently by the secondary electric machine 22. Such an approach allows the e-accessory 24 to remain operational without rotating/de-clutching downstream driveline components, and to be more efficient relative to driving the e-accessory 24 with a single oversized primary electric machine 20. If the vehicle 15 of FIG. 1 is moving, the clutch 25 of FIG. 1 may be applied depending on operating requirements. This action may enable a power assist function during periods of positive power demand when the e-accessory 24 is not required, or when the demand on the e-accessory 24 allows for some of its available torque to be used to assist with propulsion. During deceleration, regenerative braking energy may be more efficiently delivered to the e-accessory 24. If the e-accessory 24 is not required, full regenerative braking energy may be recuperated for positive power use.

Moreover, for P0-type configurations like FIG. 4, during restart of the engine 12 the secondary electric machine 22 is controllable to help crank the engine 12. If the e-accessory 24 is running, such as when configured as an air conditioning compressor, demand of the e-accessory 24 may be momentarily set to zero, e.g., by de-clutching the e-accessory or use of other HVAC control actions. To minimize noise, vibration, and harshness effects, the torque from the secondary electric machine 22 may be ramped down to zero as the clutch 25 is applied, which causes the speed of the secondary electric machine 22 to fall to zero due to the resistance of the cranking torque to engine 12. Secondary torque is then ramped up to crank the engine 12 to a desired speed for firing the engine 12, with the secondary torque reapplied to drive the e-accessory 24 at a desired demand.

Alternatively, in a quick-start mode, the inertia of the secondary electric machine 22 may be used to crank the engine 12 by increasing the secondary torque ($T_S$) as the clutch 25 is applied. In this instance, the speed of the secondary electric machine 22 falls without actually reaching zero. During EV operation or when sailing, the secondary electric machine 22 may be used to rotate the engine 12 of FIG. 4 at a speed greater than the minimum firing speed of engine 12, but still low enough to minimize electric power consumption. This may be advantageous to restarting the engine 12 quickly and smoothly when an operator has a change of mind.

In a power-split operating mode, the controller 50 may determine the ideal power split between the primary and secondary electric machines 20 and 22 based on a driver-requested or autonomously-requested goal. Power sharing may be determined by the operating torque for each of the respective primary and secondary electric machines 20 and 22 that minimizes total required electrical power, for instance. In a regeneration mode, this maximizes the absolute value of regeneration.

When present, the load of the e-accessory 24 is factored as an existing load into the power sharing optimization described above. Alternatively, the excess capacity of the secondary electric machine 22 may be applied for NVH reasons if a vehicle using the powertrain system 10A of FIG. 4 operates in EV mode. Regardless of the embodiment, the controller 50 derives an available amount of secondary motor torque as a difference between a maximum torque capacity of the secondary electric machine 22 and the accessory torque demand, thereafter commanding clutch 25 to close when the available amount of secondary motor torque exceeds a threshold. These and other attendant benefits of the method 100 will be readily appreciated by one of ordinary skill in the art in view of the present disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A hybrid electric powertrain system comprising:
    a transmission having an input member and an output member, wherein the output member is connected to a load;
    an electrically-powered accessory (e-accessory) powered via a secondary motor torque in response to an accessory torque demand;
    an internal combustion engine providing an engine torque;
    a primary electric machine providing a primary motor torque, wherein the internal combustion engine and the primary electric machine are connected to the input member and are configured, alone or in combination, to provide input drive torque to the input member;
    a secondary electric machine providing a secondary motor torque, the secondary electric machine being connected to the e-accessory and satisfying the accessory torque demand;
    a first clutch disposed between the secondary electric machine and the input member, wherein the secondary electric machine is connected to the input member of the transmission when the first clutch is closed; and
    a controller configured, in response to an output torque request, to execute a power-sharing strategy using an objective cost function that allocates a respective contribution of the engine torque, the primary motor torque, and the secondary motor torque to the input member to satisfy the output torque request, and to simultaneously satisfy the accessory torque demand via the secondary electric machine.

2. The hybrid electric powertrain of claim 1, wherein the e-accessory is an air conditioning compressor.

3. The hybrid electric powertrain of claim 1, further comprising: a first endless drive element connecting the secondary electric machine to the input member via the first clutch when the first clutch is closed.

4. The hybrid electric powertrain of claim 3, wherein the primary electric machine is continuously connected to the input member via the first endless drive element.

5. The hybrid electric powertrain system of claim 3, further comprising:
    a second clutch disposed between the internal combustion engine and the input member;
    a second endless drive element that is continuously connected to the primary electric machine and selectively connected to the internal combustion engine via the second clutch; and
    a third clutch selectively connecting the first endless drive element and the secondary electric machine to the internal combustion engine.

6. The hybrid electric powertrain system of claim 3, further comprising: a second endless drive element and a second clutch that, when in a closed state, together connect the engine to the first endless drive element.

7. The hybrid electric powertrain system of claim 1, wherein the controller is configured to open the first clutch and power the e-accessory via the secondary electric machine responsive to the internal combustion engine being in an off state.

8. The hybrid electric powertrain system of claim 1, wherein the objective cost function is calculated using a three-level optimization search on the engine torque, the primary motor torque, and the secondary motor torque.

9. The hybrid electric powertrain system of claim 1, wherein the controller is configured to derive an available amount of the secondary motor torque as a difference between a maximum torque capacity of the secondary electric machine and the accessory torque demand, and to command the first clutch to close when the available amount of the secondary motor torque exceeds a threshold.

10. The hybrid electric powertrain system of claim 1, wherein the load is a set of drive wheels of a motor vehicle.

11. The hybrid electric powertrain system of claim 1, wherein the controller is configured to receive a requested goal of the objective cost function, and to allocate the respective contribution of the engine torque, the primary motor torque, and the secondary motor torque using the requested goal.

12. The hybrid electric powertrain system of claim 11, wherein the goal of the objective cost function includes minimizing a total required electrical power of the hybrid electric powertrain system.

13. A power sharing method for use with a hybrid electric powertrain system having a transmission, primary and secondary electric machines, an electrically-powered accessory (e-accessory) powered by the secondary electric machine, and an internal combustion engine, the method comprising:
   providing a secondary motor torque to the e-accessory via the secondary electric machine at a level sufficient for satisfying an accessory torque demand of the e-accessory;
   receiving an output torque request via a controller;
   responsive to a power sharing mode signal, closing a first clutch via the controller to thereby connect the secondary electric machine to an input member of the transmission; and
   allocating, via the controller using an objective cost function, a respective contribution of engine torque from the internal combustion engine, primary motor torque from the primary electric machine, and secondary motor torque from the secondary electric machine to the input member to satisfy the output torque request while satisfying the accessory torque demand.

14. The method of claim 13, wherein the e-accessory is an air conditioning compressor.

15. The method of claim 13, further comprising: transferring the secondary motor torque to the input member via a first endless drive element when the first clutch is closed.

16. The method of claim 15, wherein the primary electric machine is continuously connected to the input member via the first endless drive element.

17. The method of claim 13, including, the method further comprising:
   using a second endless drive element to transfer the primary motor torque to the internal combustion engine via a second clutch disposed between the engine and the input member; and
   closing a third clutch to selectively connect the first endless drive element and the secondary electric machine to the internal combustion engine.

18. The method of claim 13, further comprising: opening the first clutch and powering the e-accessory via the secondary electric machine responsive to the internal combustion engine being in an off state.

19. The method of claim 13, wherein the objective cost function is calculated using a three-level optimization search on the engine torque, the primary motor torque, and the secondary motor torque, the method further comprising:
   receiving a requested goal of the objective cost function via the controller; and
   allocating the respective contribution of the engine torque, the primary motor torque, and the secondary motor torque using the requested goal.

20. The method of claim 13, further comprising: deriving an available amount of the secondary motor torque as a difference between a maximum torque capacity of the secondary electric machine and the accessory torque demand; and
   commanding the first clutch to close when the available amount of the secondary motor torque exceeds a threshold.

* * * * *